US007470417B2

(12) United States Patent
Ziegler et al.

(10) Patent No.: US 7,470,417 B2
(45) Date of Patent: Dec. 30, 2008

(54) OZONATION OF CARBON NANOTUBES IN FLUOROCARBONS

(75) Inventors: Kirk J. Ziegler, Gainesville, FL (US); Jonah Shaver, Houston, TX (US); Robert H. Hauge, Houston, TX (US); Richard E. Smalley, deceased, late of Houston TX (US); by Irene Morin Marek, legal representative, Houston, TX (US)

(73) Assignee: William Marsh Rice University, Houston, TX (US)

( * ) Notice: Subject to any disclaimer, the term of this patent is extended or adjusted under 35 U.S.C. 154(b) by 605 days.

(21) Appl. No.: 11/285,232

(22) Filed: Nov. 22, 2005

(65) Prior Publication Data

US 2006/0159612 A1 Jul. 20, 2006

Related U.S. Application Data

(60) Provisional application No. 60/630,545, filed on Nov. 23, 2004.

(51) Int. Cl.
*C09C 1/56* (2006.01)
*B82B 3/00* (2006.01)

(52) U.S. Cl. ............... 423/447.1; 423/460; 423/447.6; 977/847

(58) Field of Classification Search ... 423/447.1–447.8, 423/460; 977/845, 847
See application file for complete search history.

(56) References Cited

FOREIGN PATENT DOCUMENTS

WO WO 02/060812 8/2002

OTHER PUBLICATIONS

Gu, et al., Cutting Single-Wall Carbon Nanotubes through Fluorination, Nano Letters 2002; 2(9): 1009-1013.*
Cai, et al., Ozonation of Single-Walled Carbon Nanotubes and Their Assemblies on Rigid Self-Assembled Monolayers, Chem. Mater. 2002; 14: 4235-4241.*
Heymann, et al., C60O3, a Fullerene Ozonide: Synthesis and Dissociation to C60O and O2, J. Am. Chem. Soc. 2000; 122:11473-11479.*
Chen, et al., Cutting of Single-Walled Carbon Nanotubes by Ozonolysis, J. Phys. Chem. B. 2006; 110: 11624-11627.*
Iijima, "Helical microtubules of graphitic carbon", 354 Nature (1991) pp. 56-58.
Iijima et al., "Single shell carbon nanotubes of 1-nm diameter", 363 Nature (1993) pp. 603-605.
Bethune et al., "Cobalt-catalysed growth of carbon nanotubes with single-atomic-layers walls", 363 Nature (1993) pp. 605-607.
Baughman et al., "Carbon Nanotubes—the Route Toward Application", 297 Science (2002), pp. 787-792.
Ebbesen, "Carbon Nanotubes" 24 Annu. Rev. Mater. Sci. (1994), pp. 235-264.
Thess et al., "Crystalline Ropes of metallic Carbon nanotubes", 273 Science (1996), pp. 483-487.
Vander Wal et al., "Flame synthesis of Fe catalyzed single-walled carbon nanotubes and Ni catalyzed nanofibers . . . ", 349 Chem. Phys. Lett. (2001), pp. 178-184.
Hafner et al., "Catalytic growth of single-wall carbon nanotubes from metal particles", 296 Chem. Phys. Lett. (1998), pp. 195-202.
Cheng et al., "Bulk morphology and diameter distribution of single-walled carbon nanotubes..", 289 Chem. Phys. Lett. (1998), pp. 602-610.
Nikolaev et al., "Gas-phase catalytic growth of single-walled carbon nanotubes from carbon monoxide", 313 Chem. Phys. Lett. (1999), pp. 91-97.
Strano et al., "The Role of Surfactant Adsorption during Ultrasonication in the Dispersion of Single-Walled carbon Nanotubes", 3 J. Nanosci. and Nanotech. (2003), pp. 81-86.
O'Connell et al., "Reversible water-solubilization of single-walled carbon nanotubes by polymer wrapping", 342 Chem. Phys. Lett. (2001), pp. 265-271.
Liu et al., "Fullerene Pipes", 280 Science (1998), pp. 1253-1256.
Chen et al., "Solution Properties of Single-Walled Carbon Nanotubes", 282 Science (1998), pp. 95-98.
Khabashesku et al., "Fluorination of Single-Wall Carbon Nanotubes and Subsequent Derivatization Reactions", 35 Acc. Chem. Res. (2002), pp. 1087-1095.
Holzinger et al., "Sidewall Functionalization of Carbon Nanotubes" 40 Angew. Chem. Int. Ed. (2001), pp. 4002-4005.
Ying et al., "Functionalization of Carbon nanotubes by Free radicals", 5 Org. Letters (2003), pp. 1471-1473.
Bahr et al., "Functionalization of Carbon Nanotubes by Electrochemical Reduction of Aryl Diazonium Salts: A Bucky Paper Electrode", J. Am. Chem. Soc., 2001, 123, 6536-6542.
Kamaras et al., "Covalent Bond Formation to a Carbon nanotube Metal", 301 Science (2003), p. 1501.
Banerjee et al., "Demonstration of Diameter-Selective Reactivity in the Sidewall Ozonation of SWNTs by Resonance Raman Spectroscopy", 4 Nano Lett. (2004), pp. 1445-1450.
Gu et al., "Cutting Single-Wall Carbon Nanotubes through Fluorination", 2 Nano Lett. (2002), pp. 1009-1013.
Ziegler et al., "Controlled Oxidative Cutting of Single-Walled Carbon Nanotunes", 127 J. Am. Chem. Soc. (2005), pp. 1541-1547.

* cited by examiner

*Primary Examiner*—Stuart L. Hendrickson
*Assistant Examiner*—Daniel C. McCracken
(74) *Attorney, Agent, or Firm*—Winstead PC

(57) ABSTRACT

The present invention is generally directed to methods of ozonating CNTs in fluorinated solvents (fluoro-solvents), wherein such methods provide a less dangerous alternative to existing ozonolysis methods. In some embodiments, such methods comprise the steps of: (a) dispersing carbon nanotubes in a fluoro-solvent to form a dispersion; and (b) reacting ozone with the carbon nanotubes in the dispersion to functionalize the sidewalls of the carbon nanotubes and yield functionalized carbon nanotubes with oxygen-containing functional moieties. In some such embodiments, the fluoro-solvent is a fluorocarbon solvent, such as a perfluorinated polyether.

20 Claims, No Drawings

OZONATION OF CARBON NANOTUBES IN FLUOROCARBONS

CROSS-REFERENCE TO RELATED APPLICATIONS

This application for patent claims priority to U.S. Provisional Patent Application Ser. No. 60/630,545, filed Nov. 23, 2004.

FIELD OF THE INVENTION

This invention relates generally to methods of functionalizing carbon nanotubes, and specifically to methods of ozonating carbon nanotubes in fluorinated solvents.

BACKGROUND

Carbon nanotubes (CNTs), comprising multiple concentric shells and termed multi-wall carbon nanotubes (MWNTs), were discovered by Iijima in 1991 [Iijima, Nature 1991, 354, 56-58]. Subsequent to this discovery, single-wall carbon nanotubes (SWNTs), comprising single graphene sheets rolled up on themselves to form cylindrical tubes with nanoscale diameters, were synthesized in an arc-discharge process using carbon electrodes doped with transition metals [Iijima et al., Nature 1993, 363, 603-605; and Bethune et al., Nature 1993, 363, 605-607]. These carbon nanotubes (especially SWNTs) possess unique mechanical, electrical, thermal and optical properties, and such properties make them attractive for a wide variety of applications. See Baughman et al., Science, 2002, 297, 787-792.

Methods of making CNTs include the following techniques: arc discharge [Ebbesen, Annu. Rev. Mater. Sci. 1994, 24, 235-264]; laser oven [Thess et al., Science 1996, 273, 483-487]; flame synthesis [Vander Wal et al., Chem. Phys. Lett. 2001, 349, 178-184]; and chemical vapor deposition [U.S. Pat. No. 5,374,415], wherein a supported [Hafner et al., Chem. Phys. Lett. 1998, 296, 195-202] or an unsupported [Cheng et al., Chem. Phys. Lett. 1998, 289, 602-610; Nikolaev et al., Chem. Phys. Lett. 1999, 313, 91-97] metal catalyst may also be used.

Techniques of suspending and chemically functionalizing CNTs have greatly facilitated the ability to manipulate these materials, particularly for SWNTs which tend to assemble into rope-like aggregates [Thess et al., Science, 1996, 273, 483-487]. Such suspending techniques typically involve dispersal of CNTs with surfactant and/or polymer material [see Strano et al., J. Nanosci. and Nanotech., 2003, 3, 81; O'Connell et al. Chem. Phys. Lett., 2001, 342, 265-271]. Such chemical functionalization of CNTs is generally divided into two types: tube end functionalization [see, e.g., Liu et al., Science, 1998, 280, 1253-1256; Chen et al., Science, 1998, 282, 95-98], and sidewall functionalization [see, e.g., PCT publication WO 02/060812 by Tour et al.; Khabashesku et al., Acc. Chem. Res., 2002, 35, 1087-1095; and Holzinger et al., Angew. Chem. Int. Ed., 2001, 40, 4002-4005], and can serve to facilitate the debundling and dissolution of such CNTs in various solvents. Scalable chemical strategies have been, and are being, developed to scale up such chemical manipulation [Ying et al., Org. Letters, 2003, 5, 1471-1473, Bahr et al., J. Am. Chem. Soc., 2001, 123, 6536-6542; and Kamaras et al., Science, 2003, 301, 1501].

Regarding the above-mentioned functionalization of CNTs, few methods exist which render CNTs soluble/suspendable in water—a requirement for many biological applications. Because of their native hydrophobicity, sidewall functionalization represents the best functionalization methodology for generating water-soluble CNTs. Toward this end, researchers have devised methods of reacting CNTs with ozone ($O_3$), i.e., ozonating CNTs, so as to impart them with oxygen-containing groups that can optionally be further reacted to yield hydrophilic moieties [Banerjee et al., Nano Lett., 2004, 4, 1445-1450]. Such ozonating, however, is presently accomplished with a dangerous combination of a strong oxidant ($O_3$) and a combustible solvent, and is generally carried out at dry ice/acetone temperatures. As a result, a less dangerous method for ozonating CNTs would be quite useful, particularly wherein such low temperatures are not required, and wherein resulting functionalization yields are higher.

BRIEF DESCRIPTION OF THE INVENTION

Generally, the present invention is directed to methods of ozonating CNTs in fluorinated solvents (fluoro-solvents), wherein such methods provide a less dangerous alternative to existing ozonolysis methods. In some embodiments, such methods comprise the steps of: (a) dispersing carbon nanotubes in a fluoro-solvent to form a dispersion; and (b) reacting ozone with the carbon nanotubes in the dispersion to functionalize the sidewalls of the carbon nanotubes and yield functionalized carbon nanotubes with oxygen-containing functional moieties. In some such embodiments, the fluoro-solvent is a fluorocarbon solvent, such as a perfluorinated polyether.

In some of the above-described embodiments, the reacting is stopped when the carbon nanotubes have been functionalized to a desired level. In some such embodiments, this is enabled by monitoring the reaction progress in situ with Raman spectroscopy.

In some of the above-described embodiments, there further comprises a step of extracting the functionalized nanotubes from the dispersion into an alcohol solvent, and, optionally, a post-reacting step selected from the group consisting of filtering, washing, drying, and combinations thereof.

The foregoing has outlined rather broadly the features of the present invention in order that the detailed description of the invention that follows may be better understood. Additional features and advantages of the invention will be described hereinafter which form the subject of the claims of the invention.

DETAILED DESCRIPTION OF THE INVENTION

Generally, the present invention is directed to methods of ozonating CNTs in fluorinated solvents (i.e., ozonolysis), wherein such methods provide a less dangerous alternative to existing ozonolysis methods. Such ozonolysis generally serves to chemically functionalize the sidewalls of CNTs with oxygen-containing functional moieties. While current ozonolysis schemes make use of the high solubility of ozone in alcohols such as methanol and ethanol at dry ice/acetone temperatures, oxidant fuel reactions are inherently dangerous. Ozonolysis in methanol and ethanol are usually done at −70° C. to −80° C. and formation of ozonides at these low temperatures presents a dangerous situation. When ozonides are allowed to warm to room temperature without being quenched, there is a danger of explosion. In order to avoid this, the present invention utilizes fluorinated solvents and has been found to give higher than or equal degrees of functionalization (relative to the prior art methods), while avoiding dangerous and extreme conditions. Such reduced levels of danger also enable the possibility of carrying out such processing on large scales.

In some embodiments, the present invention is directed to methods comprising the steps of: (a) dispersing carbon nanotubes in a fluoro-solvent to form a dispersion; and (b) reacting ozone with the carbon nanotubes in the dispersion to functionalize the sidewalls of the carbon nanotubes and yield functionalized carbon nanotubes with oxygen-containing functional moieties.

Carbon nanotubes (CNTs) can be generally of any type and made by any known method. Typically such carbon nanotubes are selected from the group consisting of single-wall carbon nanotubes (SWNTs), multi-wall carbon nanotubes (MWNTs), double-wall carbon nanotubes, and combinations thereof. In some embodiments, the CNTs are subjected to one or more post-synthesis processes prior to undergoing ozonolysis. Such process include, but are not limited to, cutting, purification, length sorting, diameter sorting, and combinations thereof.

The fluoro-solvent is generally any fluorine-containing liquid in which $O_3$ is suitably soluble and into which CNTs can be suitably dispersed. In some embodiments, the fluoro-solvent is a fluorocarbon solvent. An exemplary class of such fluorocarbon solvents is perfluorinated polyethers (PFPEs).

In some of the above-described embodiments, the step of dispersing comprises a homogenizing process. In some such embodiments, the homogenizing process involves a homogenizing technique such as, but not limited to, stirring, shaking, ultrasonicating, and combinations thereof.

In some of the above-described embodiments, in the step of reacting, the ozone is bubbled through the dispersion. Typically, the reacting is allowed to proceed for a duration and then the reacting is stopped when the CNTs have been functionalized to a desired level. In some embodiments, the reacting is monitored in situ with Raman spectroscopy or another suitably non-invasive monitoring technique.

In some of the above-described embodiments, there further comprises a step of extracting the functionalized nanotubes from the dispersion into an alcohol or other suitable solvent. In some such embodiments, the alcohol solvent is ethanol. In some such embodiments, the extracting is carried out in a separatory funnel. Note that utilizing different fluoro-solvents will likely require different extraction solvents (e.g., long and short chain PFPEs were found to require ethyl ether and ethanol, respectively). Variation of chain length should vary the degree of solubility as well as ease of extraction of the CNTs. Additionally or alternatively, in some of the above-described embodiments, there further comprises a post-reacting step such as, but not limited to, filtering, washing, drying, and combinations thereof.

In some of the above-described embodiments, the functionalized CNTs comprise functional moieties selected from the group consisting of hydroxyl groups, epoxide groups, quinine groups, and combinations thereof.

In some of the above-described embodiments, there further comprises a step of functionalizing the functionalized CNTs such that the functionalized CNTs serve as intermediates for subsequent functionalization. In such a manner, the ozonolysis can provide an indirect route to having a variety of otherwise potentially inaccessible functional moieties on CNT sidewalls.

The present invention provides an efficient route to creating oxygen-containing functional groups on CNT sidewalls. These oxygen-containing groups can be utilized for further reactions to place other functional groups on the sidewalls through ether or other linkages. These linkages can also be cleaved to form diols that result in water soluble nanotubes. In some embodiments, the degree of functionality achieved by the ozonation is approximately 1 functional group per every 5 carbon nanotube-based carbon atoms (as determined by X-ray photoelectron spectroscopy). This is remarkable given that other approaches that are utilized for functionalization typically only achieve 1 functional group per every 20-30 such carbon atoms. Consequently, the solubility of nanotubes in various solvents may be dramatically improved by utilizing ozonated nanotubes produced by methods presented herein.

Various cutting techniques have been developed by Applicants, all of which comprise a two step process of marking the nanotube sidewalls and then oxidatively exploiting those markings to make short pieces. See, e.g., Gu et al., *Nano Lett.* 2002, 2, 1009-1013; and Ziegler et al., *J. Am. Chem. Soc.* 2005, 127, 1541-1547. It is believed that ozonation of CNTs on a large scale will allow generation of defect sites that are vulnerable to oxidative attack. It is likely that this process will enable the kilogram scale cutting of CNTs for use in various applications.

The following examples are included to demonstrate particular embodiments of the present invention. It should be appreciated by those of skill in the art that the methods disclosed in the examples that follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLE 1

In an exemplary scenario, a fluoro-solvent/fluorocarbon solvent such as perfluorinated polyethers (PFPE) can be used in the practice of the present invention. In such a scenario, a dispersion of CNTs in PFPE can be prepared in a 3-neck flask by magnetic stirring and high sheer homogenization. The resulting suspension then has ozone bubbled through it for various times while monitoring the progress of the reaction in situ with Raman spectroscopy. After a desired level of functionalization has been reached (monitored by Raman spectra), the ozone flow is stopped and the suspension is purged by inert gas for ~30 minutes to an hour. After the suspension has been sufficiently purged of residual ozone, it is transferred to a separation funnel. An equal volume of ethanol (immiscible with the PFPE) is added to the funnel and the mixture is shaken to extract the nanotubes into the ethanol phase. The PFPE is then drained away and saved for distillation and reuse. Hexane and ethyl ether are then added to the nanotube-ethanol suspension to cause the nanotubes to flocculate out and remove any residual PFPE. This mixture is then filtered and the nanotubes are vacuum dried at a temperature close to the boiling point of the PFPE.

EXAMPLE 2

A series of SWNT ozonolysis experiments, similar to that described in Example 1, tested short (~15 minutes) and long (~3 hour) exposures to ozone as well as cold (−78° C.), room (22° C.), and hot (50° C.) reaction times and temperatures. It was determined that, at the lowest temperature, there existed a steep increase in the D/G ratio, which quickly plateaued. While not intending to be bound by theory, Applicants attributed this to the rapid functionalization of the nanotubes on the outside of a bundle, but the reaction conditions were unable to penetrate into the bundles to functionalize the remaining nanotubes. At room temperature or higher, Applicants found that the reaction proceeded slower but reacted continuously.

Applicants attributed this result to mean that under these conditions the solvent/reactants were able to penetrate the bundles and react with all nanotubes to give a more uniformly-functionalized material. The highest temperature used seemed to start destroying the tubes. Applicants therefore thought it was best to do these reactions at room temperature for a uniformly functionalized material without losing too much of the product from oxidation. Additionally, it is likely that such reaction conditions can be manipulated to control the ratio of hydroxyl, epoxide, and quinine groups, all of which were formed during ozonation.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method comprising the steps of:
   a) dispersing carbon nanotubes in a fluoro-solvent to form a dispersion; and
   b) reacting ozone with the carbon nanotubes in the dispersion to functionalize the sidewalls of the carbon nanotubes and yield functionalized carbon nanotubes with oxygen-containing functional moieties.

2. The method of claim 1, wherein the carbon nanotubes are selected from the group consisting of single-wall carbon nanotubes, multi-wall carbon nanotubes, double-wall carbon nanotubes, and combinations thereof.

3. The method of claim 1, wherein the fluoro-solvent is a fluorocarbon solvent.

4. The method of claim 3, wherein the fluorocarbon solvent is a perfluorinated polyether.

5. The method of claim 1, wherein the step of dispersing comprises a homogenizing process.

6. The method of claim 5, wherein the homogenizing process involves a technique selected from the group consisting of stirring, shaking, ultrasonicating, and combinations thereof.

7. The method of claim 1, wherein the ozone is bubbled through the dispersion.

8. The method of claim 1, wherein the step of reacting is monitored in situ with Raman spectroscopy.

9. The method of claim 1, wherein the step of reacting is stopped when the carbon nanotubes have been functionalized to a desired level.

10. The method of claim 1 further comprising a step of extracting the functionalized nanotubes from the dispersion into an alcohol solvent.

11. The method of claim 10, wherein the alcohol solvent is ethanol.

12. The method of claim 10, wherein the step of extracting is carried out in a separatory funnel.

13. The method of claim 1 further comprising a post-reacting step selected from the group consisting of filtering, washing, drying, and combinations thereof.

14. The method of claim 1, wherein the functionalized carbon nanotubes comprise functional moieties selected from the group consisting of hydroxyl groups, epoxide groups, quinine groups, and combinations thereof.

15. The method of claim 1 further comprising a step of further functionalizing the functionalized carbon nanotubes such that the functionalized carbon nanotubes serve as intermediates for subsequent functionalization.

16. A method comprising the steps of:
   a) dispersing single-wall carbon nanotubes in a fluorocarbon solvent to form a dispersion; and
   b) reacting ozone with the single-wall carbon nanotubes in the dispersion to functionalize the sidewalls of the single-wall carbon nanotubes and yield functionalized single-wall carbon nanotubes with oxygen-containing functional moieties.

17. The method of claim 16, wherein the fluorocarbon solvent comprises a perfluorinated ether.

18. The method of claim 16 further comprising a step of extracting the functionalized single-wall carbon nanotubes from the dispersion into an alcohol solvent.

19. The method of claim 16, wherein the step of reacting is monitored in situ with Raman spectroscopy.

20. The method of claim 16, wherein the step of reacting is stopped when the single-wall carbon nanotubes have been functionalized to a desired level.

* * * * *